United States Patent [19]

Duncan

[11] Patent Number: 4,578,297

[45] Date of Patent: Mar. 25, 1986

[54] POLYMER FILM/POLYMER FOAM LAMINATE AND HEAT-RESISTANT CONTAINER FABRICATED THEREFROM

[75] Inventor: Gary L. Duncan, Fairport, N.Y.

[73] Assignee: Mobil Oil Corporation, New York, N.Y.

[21] Appl. No.: 754,052

[22] Filed: Jul. 11, 1985

[51] Int. Cl.$^4$ .................. B32B 1/02; B32B 3/26
[52] U.S. Cl. .................. 428/35; 428/313.3; 428/315.5; 428/316.6; 428/317.9; 428/323; 428/910
[58] Field of Search ............ 428/35, 314.4, 314.8, 428/315.5, 315.7, 315.9, 316.6, 317.9, 313.3, 313.5, 313.9, 323, 910

[56] References Cited

U.S. PATENT DOCUMENTS

| | | | |
|---|---|---|---|
| 3,262,827 | 7/1966 | Kallander et al. | 428/315.5 |
| 3,751,329 | 8/1973 | Fonzi et al. | 428/315.5 |
| 4,062,712 | 7/1977 | Stock | 428/319.9 |
| 4,088,805 | 5/1978 | Wiegand | 428/319.9 |
| 4,101,050 | 7/1978 | Buckler et al. | 428/319.9 |
| 4,363,848 | 12/1982 | Le Duc et al. | 428/319.9 |
| 4,377,616 | 3/1983 | Ashcraft et al. | 428/315.7 |
| 4,496,620 | 1/1985 | Park et al. | 428/910 |
| 4,500,596 | 2/1985 | Lee | 428/319.9 |

*Primary Examiner*—William J. Van Balen
*Attorney, Agent, or Firm*—Alexander J. McKillop; Michael G. Gilman; Charles J. Speciale

[57] ABSTRACT

A heat resistant laminate structure is provided which comprises:

(a) a thermoplastic polymer matrix core layer having an upper and lower surface and within which is located a strata of voids;

positioned at least substantially within at least a substantial number of voids is at least one spherical void-initiating particle which is phase distinct and incompatible with the matrix material, the void space occupied by said particle being substantially less than the volume of said void, with one generally cross-sectional dimension of said particle at least approximating a corresponding cross-sectional dimension of said void;

(b) a void-free thermoplastic skin layer affixed to the upper surface of core layer (a); and, (c) a thermoplastic polymer foam layer affixed to the lower surface of core layer (a).

12 Claims, No Drawings

POLYMER FILM/POLYMER FOAM LAMINATE AND HEAT-RESISTANT CONTAINER FABRICATED THEREFROM

BACKGROUND OF THE INVENTION

This invention relates to a polymer film/polymer foam laminate and to a heat resistant container manufactured therefrom.

U.S. Pat. No. 4,377,616, the contents of which are incorporated by reference herein, discloses an opaque biaxially oriented polymer film structure comprising a thermoplastic polymer matrix core layer possessing numerous voids, a substantial number of which contain at least one spherical void-initiating particle, and transparent skin layers adhering to the surfaces of the core layer. The unique structure of the core layer imparts a much higher degree of opacity, possibly due to the effects of light scattering, than that possible by the use of opacifying pigment alone. There is no disclosure or suggestion in U.S. Pat. No. 4,377,616, however, of laminating the film structure disclosed therein to a polymer foam.

SUMMARY OF THE INVENTION

It is an object of the present invention to provide a laminate possessing a polymer film layer affixed to a polymer foam layer.

More particularly, it is an object of the invention to provide a container which substantially maintains it structural and mechanical properties while subjected to microwave energy employing a laminate of a polymeric film in accordance with U.S. Pat. No. 4,377,616 applied to the surfaces of a rigid thermoplastic polymer foam.

In keeping with the foregoing objects, there is provided a laminate structure which comprises:

(a) a thermoplastic polymer matrix core layer having an upper and lower surface and within which is located a strata of voids;
    positioned at least substantially within at least a substantial number of voids is at least one spherical void-initiating particle which is phase distinct and incompatible with the matrix material, the void space occupied by said particle being substantially less than the volume of said void, with one generally cross-sectional dimension of said particle at least approximating a corresponding cross-sectional dimension of said void;
(b) a void-free thermoplastic skin layer affixed to the upper surface of core layer (a); and,
(c) a thermoplastic polymer foam layer affixed to the lower surface of core layer (a).

The process for preparing the foregoing laminate comprises:
    mixing a first thermoplastic polymeric material with a second material incompatible with said first material to form a core mixture, said second material being of a higher melting point or having a higher glass transition temperature than said first material;
    heating the core mixture to a temperature at least above the melting point of said first material;
    dispersing said second material uniformly throughout the molten first material in the form of microspheres;
    extruding the core mixture in the form of a core layer;
    adherently applying a thermoplastic skin layer to the upper surface of said core layer;
    biaxially orienting the film structure at a temperature and to an extent to form opacifying voids in said core layer so as to optimize the degree of opacity, enhance the physical characteristics and impart a lustrous satin appearance to said film structure; and,
    adherently apply a thermoplastic polymer foam to the lower surface of said core layer.

DESCRIPTION OF THE PREFERRED EMBODIMENTS

In order to achieve the unique lustrous satin appearance of the film structure employed in the laminate of the present invention, it is important that a particular thickness relationship exist between the thickness dimension of core layer (a) and the thickness dimension of skin layer (b). It is preferred that the core thickness be from about 30 to about 85% of the overall structure. This, in combination with the population and configuration of the voids in a structure at least about 0.5 mils thick, will materially contribute to the overall degree of opacity of the structure. Likewise, by maintaining the skin thickness within a particular range in relation to the overall structure and to the thickness of the core layer, the overall combination results in the unique lustrous satin appearance of the film combination. It is preferred that the combined skin thickness be about 15 to about 70% of the overall film structure. It is important that the skin layer be sufficiently thick so that the outer surface thereof does not manifest the irregularities or surface projections of the underlying core material. If this was not the case, the lustrous appearance of the satin finish would be materially lessened.

It is preferred that the average diameter of the void-initiating particles be from about 0.1 to about 10 microns. These particles should be spherical in shape so as to initiate a void of unusual regularity and orientation in a stratified relationship throughout the matrix material after biaxial orientation of the system. This does not mean that every void is the same size. It means that, generally speaking, each void tends to be of like shape, even though they vary in dimensions, because they are all initiated by a spherical particle. Ideally, any of these voids assume a shape defined by two opposed and edge-contacting concave disks. Optimum characteristics of opacity and satin-like appearance are obtained when the two average major dimensions are greater than about 30 microns.

The void-initiating particle material, as indicated above, should be incompatible with the core material, at least at the temperature of biaxial orientation.

The core has been described above as being a thermoplastic polymer matrix within which is located a strata of voids. From this it is to be understood that the voids create the matrix configuration. The term "strata" is intended to convey the understanding that there are a large number of voids creating the matrix and the voids themselves are oriented so that the two major dimensions are aligned in correspondence with the direction of orientation of the polymeric film structure. After each void has been formed through the initiation of a spherical particle, the particle may contribute little else to the system. This is because its refractive index can be close enough to the matrix material that it makes no contribution to opacity. When this is the case, the opacity is principally a function of the light scattering affect which occurs because of the existence of the voids in the system. The opacity of the system can be somewhat enhanced by the inclusion therein of an opacifying pigment dispersed throughout. A particularly preferred proportion of pigment in the core layer can be from about 1 to about 3% by weight of the core. The pigment material is present in such a particle size and shape that it does not, at least in any material sense, contribute any void initiation by itself. The optional presence of the opacifying pigment contributes perhaps 3 to 8% to the degree of opacity of the system.

A typical void of the core is defined as having major dimensions X and Y and minor dimension Z, where dimension X is aligned with machine direction orientation, dimension Y is aligned with transverse direction orientation and dimension Z approximately corresponds to the cross-sectional dimension of the spherical particle initiating the void, the X and Y dimensions being significantly greater. In addition, the orientation conditions must be such that the general integrity of the voids is maintained. By this, it is meant that during the orientation which produces the X and Y dimensions, that is, either by simultaneous or sequential machine direction and transverse direction stretching, the temperature conditions must be such as to permit these major dimensions to form without any destruction of the voids in any of their dimensions. The voids are particularly vulnerable to destruction during sequential orientation if the stretching temperature is too low. Even in simultaneous orientation, if the temperature is too low, the stretching forces will tend to cause internal shredding and void splitting. This leads to a complete loss of control over the integrity of the individual closed voids and the consequent integrity of the matrix polymer. Thus, one skilled in the art following the present general guidelines can orient at a temperature and to a degree which will yield X and Y dimensions approaching a maximum without causing any significant splitting, shredding or overall lack of void and matrix integrity.

By way of illustration, room temperature biaxial orientation of a polypropylene matrix containing nylon spheres of the size and amount contemplated herein, will not produce the claimed structure. Either void splitting will occur or voids of insignificant size will result. Polypropylene must be oriented at a temperature which happens to be significantly higher than its glass transition temperature. The temperature conditions must permit X and Y to be at least several multiples of the Z dimension without void splitting at least to any significant degree. If this is accomplished, optimum physical characteristics including low water vapor transmission rates and a high degree of light scattering are obtained without void splitting or film fibrillating.

As indicated above, the matrix polymer and the void initiating-particle must be incompatible and this term is used in the sense that the materials are two distinct phases. The spherical void-initiating particles constitute a dispersed phase throughout the lower melting polymer which polymer will, ultimately, upon orientation, become a void filled matrix with the spherical particles positioned somewhere in the voids.

As a result of the biaxial orientation of the combined core and skin layer structure described herein, in addition to opacifying the core layer of the structure, the orientation improves other physical properties of the composite layers such as flex-cracking resistance, Elmendorff tear strength, elongation, tensile strength, impact strength and cold strength properties. In addition to this, a lustrous satin appearance is imparted to the film structure. This appearance is not seen in the absence of the skin layer nor if the skin layer is too thin or otherwise substantially reveals the surface imperfections of the underlying core layer. The resulting film can have, in addition to a rich, high quality appearance, low water vapor transmission rate characteristics and low oxygen transmission rate characteristics.

It is believed that because of the comparative sphericality of the void-initiating particles, the voids are closed cells. This means that there is virtually no path open from one side of the core to the other through which liquid or gas can traverse.

The void-initiating particles can be organic or inorganic so long as they are spherical in shape and within the preferred particle size range so as to initiate the formation of a void, which in a significant number of cases, has a lens-like shape, that is, a lens of the biconvex shape. When a polymeric material is contemplated as the void-initiating particle, it can be a polymer which is co-melted with the polymer of the matrix or core. In this case, it is necessary for it to have a sufficiently higher melting point than the core polymer and be incompatible and capable of assuming a dispersed phase of small spherical particles as the temperature of the co-melted mix is reduced. It is also contemplated that the void-initiating particles can be preformed and then uniformly dispersed into a melt of, e.g., polypropylene. This has the advantage of not having to subject the matrix polymer to the temperature of a much higher melting polymer. In this manner, any thermal degradation of the matrix polymer is avoided.

It is believed that because of the number, the shape and the orientation strata-wise of matrix voids, a significantly enhanced light scattering effect is obtained by virtue of the present invention. This effect is further enhanced or magnified by the use of two transparent skin layers (one on each surface of the core) of the size relationship mentioned above.

When preformed spheres are employed, it is the shape and size of the sphere that is important rather than the chemical nature of the material, per se. Thus, solid or hollow organic or inorganic spheres of any type can be employed. Interesting effects can be achieved by the use of spheres of different colors. Since statistically each void has approximately one sphere somewhere within the void, interesting and pleasing color and/or reflectance effects can be imparted to the overall layer structure by the use of spheres of different color absorption or reflectance. The light scattered in a particular void is additionally either absorbed or reflected by the void-initiating sphere and a separate color contribution is made to the light scattering in each void.

Thermoplastic resins which can constitute the dispersed phase within the matrix material include the polyamides or nylons of commerce, certain polyesters, such as polyethylene terephthalate acetals, acrylic resins, etc. Inorganic materials include solid or hollow preformed glass spheres, metal beads or spheres, ceramic spheres, etc. In fact, any material which can be formed into the spheres intended without causing thermal degradation to the core material is contemplated.

By the technique of the present invention, light transmission through the foregoing polymer film structure contemplated herein can be reduced to as low as about 16%. This would be true in a film having an overall thickness of at least 1.5 mils where the core portion of this is at least 60% and the individual skin layers are 20%.

While the preferred particle size of the spheres is from about 0.1 to about 10 microns, it is particularly preferred that the particle size range from about 0.75 to about 2 microns. The void-initiating particles can be present in up to about 20% by weight of the core layer prior to orientation, a preferred range being from 2 to about 7 percent by weight.

For convenience and more precise control of the formulation and character of the core layer, a master batch technique can be employed either in the case of forming the spherical particles in situ or in adding preformed spheres to the molten core matrix material. After the formation of a master batch, appropriate dilution of this system can be made by adding additional thermoplastic core matrix material until the desired proportions are obtained.

It is preferred that the core material and the skin material be coextruded. Thereafter, biaxial orientation is carried out to an extent and at a temperature calculated to obtain the maximum degree of opacity without any significant sacrifice in the physical characteristics, including appearance, of the film structure. Obviously, as the materials employed change, the conditions of biaxial orientation will change. By way of exemplification, when employing polypropylene as the material of the core matrix and of the transparent skin layer and when employing nylon-6 as the void-initiating spheres, a machine direction orientation of from 4 to 8 times and a transverse direction orientation of from about 4 to 8 times at a drawing temperature of from 100° C. to 160° C. can be used to provide a biaxially oriented film of from 0.7 to 3 mils overall thickness.

The thermoplastic polymer foam (c) of the laminates of this invention can be chosen from amongst numerous rigid and flexible foam materials known in the art with the polyethylene, polypropylene and polystyrene foams being preferred. The foams are prepared by use of a suitable blowing agent incorporated into the resin. The blowing agent can be of the chemical type such as azodicarbonamide, benzene sulfonyl hydrazide and azobisformamide or it can be a volatile material such as pentane. Foaming occurs on extrusion of the polymer. The thickness of the foam is not critical and can be anywhere from about 2 mm to about 10 cm or more.

A variety of known and conventional techniques are available by which the opaque film structure constituting layers (a) and (b) can be affixed to one or both surfaces of foam layer (c). For example, useful articles, in particular, containers intended to store foods which are heated by microwave energy, can be readily formed employing known and conventional thermoforming procedures. In one such operation, a slab of polymer foam of desired thickness is placed on a sheet of opaque film, another sheet of opaque film is placed upon the upper exposed surface of the polymer foam, the resulting "sandwich" is placed in a mold of appropriate configuration and formed into the desired laminate article under heat and pressure. If necessary, the opaque film can be laminated to the foam layer employing an adhesive, e.g., one based on ethylene-vinyl acetate copolymer. In another bonding technique, the surface(s) of the foam are superficially melted with the opaque film structure then being applied thereto. These and similar article-forming operations can be carried out with or without lamina bonding adhesives depending on the nature of the components of the laminate, the intended use of the laminate and other factors apparent to those skilled in the art.

EXAMPLE

A mixture of isotactic polypropylene (93 parts, MP 160° C. and a melt index of 4.5) and nylon-6 (7 parts, MP 225° C.) is melted in an extruder provided with a screw of L/D ratio of 20/1. A second extruder in association with this first mentioned extruder is supplied with the same polypropylene but without the nylon-6 present. A melt coextrusion is carried out while maintaining the cylinder of the core material at a temperature ranging from 190° C. to 220° C. The polypropylene to be extruded as the skin layer is maintained at a temperature of 220° C. A film structure is coextruded with the core thickness 60% of the total extruded thickness. The skin layer is approximately 40% of the total thickness. The unoriented film measures approximately 30 mils in thickness. This sheet is subsequently oriented seven by seven and one-half times using a commercially available sequential biaxially orienting apparatus to provide a film of about 1.7 mil. The MD orientation temperature is about 105° C. and the TD orientation about 135° C. The exposed surface of the matrix core layer is then flame laminated to each major surface of a rigid polypropylene foam layer of about 5 mm thickness and about 2.5 pounds per cubic foot density to provide the laminate structure of the invention. The laminate structure is ideally suited to be thermoformed into cups, containers, trays, plates, sheets, etc., having an attractive glossy, pearlescent appearance.

What is claimed is:

1. A laminate structure which comprises:
   (a) a thermoplastic polymer matrix core layer having an upper and lower surface and within which is located a strata of voids;
   positioned at least substantially within at least a substantial number of voids is at least one spherical void-initiating particle which is phase distinct and incompatible with the matrix material, the void space occupied by said particle being substantially less than the volume of said void, with one generally cross-sectional dimension of said particle at least approximating a corresponding cross-sectional dimension of said void;
   (b) a void-free thermoplastic skin layer affixed to the upper surface of core layer (a); and,
   (c) a thermoplastic polymer foam layer affixed to the lower surface of core layer (a).

2. The laminate structure of claim 1 wherein core layer (a) is isotactic polypropylene.

3. The laminate structure of claim 1 wherein in said core (a), said spherical particle is inorganic.

4. The laminate structure of claim 1 wherein in said core layer (a), said spherical particle is an organic material.

5. The laminate structure of claim 4 wherein in said core layer (a), said organic material is a polymer.

6. The laminate structure of claim 1 wherein said core layer (a) is coextruded with skin layer (b).

7. The laminate structure of claim 6 wherein said skin layer (b) is isotactic polypropylene.

8. The laminate structure of claim 1 wherein said foam layer (c) is a rigid foam.

9. The laminate structure of claim 1 wherein both major surfaces of foam layer (c) are affixed to the exposed surface of core layer (a).

10. The laminate structure of claim 1 wherein the polymer constituting core layer (a) and foam layer (c) is the same.

11. The laminate structure of claim 10 wherein the polymer is isotactic polypropylene.

12. A container prepared from the laminate structure of claim 8.

* * * * *